United States Patent
Harada

(10) Patent No.: US 6,541,064 B1
(45) Date of Patent: Apr. 1, 2003

(54) PROCESS FOR PRODUCING COMPOSITE SUBSTRATE MATERIAL

(75) Inventor: Akinori Harada, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/657,781

(22) Filed: Sep. 8, 2000

(30) Foreign Application Priority Data

Sep. 8, 1999 (JP) .......................................... 11-254350

(51) Int. Cl.⁷ ................................................. B05D 5/12
(52) U.S. Cl. .................... 427/126.3; 427/162; 427/553; 427/558
(58) Field of Search ............................ 427/126.3, 163.1, 427/553, 558, 162

(56) References Cited

U.S. PATENT DOCUMENTS

| | | | |
|---|---|---|---|
| 5,935,717 A | * | 8/1999 | Oishi et al. ............... 427/126.3 |
| 6,071,623 A | * | 6/2000 | Sugawara et al. ........ 427/163.1 |
| 6,191,062 B1 | * | 2/2001 | Hayakawa et al. ...... 427/126.3 |

FOREIGN PATENT DOCUMENTS

JP    6-90061    3/1994

OTHER PUBLICATIONS

Patent Abstract of Japan 06–090061 Mar. 29, 1994.

* cited by examiner

*Primary Examiner*—Bret Chen
(74) *Attorney, Agent, or Firm*—Sughrue Mion, PLLC

(57) ABSTRACT

A functional film, which has photo-catalytic effects, is overlaid on a surface of each of at least two substrate materials. The functional film, which has been overlaid on the surface of each of the substrate materials, is exposed to light having a wavelength falling within an absorption wavelength range of the functional film. The substrate materials are then bonded to each other with the functional films, which have been exposed to the light, intervening between the substrate materials. The functional film may be a film containing $TiO_2$, and the light irradiated to the functional film may be ultraviolet light. In cases where a film other than the functional film is also overlaid on the surface of each, of the substrate materials, the functional film is formed as a top layer.

4 Claims, 1 Drawing Sheet

PROCESS FOR PRODUCING COMPOSITE SUBSTRATE MATERIAL

BACKGROUND OF THE INVENTION

1. Field of the Invention

This invention relates to a composite substrate material comprising at least two substrates which are bonded to each other. This invention also relates to a process for producing the composite substrate material.

2. Description of the Related Art

Composite materials have heretofore been formed by bonding optical crystals, such as laser crystals, optical wavelength converting crystals, and quartz glass mirrors, to each other or by bonding optical substrates to each other. As techniques for the bonding, techniques, wherein the optical crystals or the optical substrates are adhered to each other by optical adhesive agents, or techniques, wherein the optical crystals or the optical substrates are fusion bonded under heat, have heretofore been used widely.

However, the techniques, wherein the optical crystals or the optical substrates are adhered to each other by optical adhesive agents, have the problems in that optical scattering and reflection loss are caused to occur and long-term reliability of the adhered areas is low. Particularly, as for optical members to be located within laser resonators, the problems described above arise markedly.

The techniques, wherein the optical crystals or the optical substrates are fusion bonded under heat, have the problems in that the techniques are applicable only to limited combinations of materials and can be utilized only in limited applications.

Therefore, recently, techniques for bonding different kinds of materials to each other, which techniques are referred to as wafer bonding techniques, have attracted particular attention. With the wafer bonding techniques, as described in, for example, Japanese Unexamined Patent Publication No. 6(1994)-90061, wafers of single crystals or polycrystals are subjected to mirror finish, the mirror surfaces thus obtained are washed to remove dust and organic substances and are set in a hydrophilic state, the mirror surfaces are then brought into contact with each other in a clean atmosphere, and the wafers are heated in this state.

With the wafer bonding techniques described above, a composite substrate material, having a high bond strength can be formed. However, the wafer bonding techniques have the problems in that wet processing must be performed for cleaning the substrates and therefore production steps cannot be kept simple.

SUMMARY OF THE INVENTION

The primary object of the present invention is to provide a process for producing a composite substrate material, wherein wet processing need not be performed, and a composite substrate material having a high bond strength, high long-term reliability of a bonded area, and good environmental temperature resistance characteristics is capable of being produced.

Another object of the present invention is to provide a composite substrate material having a high bond strength, high long-term reliability of a bonded area, and good environmental temperature resistance characteristics of the bonded area.

The present invention provides a process for producing a composite substrate material, comprising the steps of:

i) overlaying a functional film, which has photo-catalytic effects, on a surface of each of at least two substrate materials, ii) exposing the functional film, which has been overlaid on the surface of each of the at least two substrate materials, to light having a wavelength falling within an absorption wavelength range of the functional film, and iii) bonding the at least two substrate materials to each other with the functional films, which have been exposed to the light, intervening between the at least two substrate materials.

In the process for producing a composite substrate material in accordance with the present invention, as the functional film, a film containing $TiO_2$ should preferably be employed. In such cases, the light irradiated to the functional film should preferably be ultraviolet light. Also, in cases where a film other than the functional film is also overlaid on the surface of each of the at least two substrate materials, the functional film should preferably be formed as a top layer.

The present invention also provides a composite substrate material produced with the process in accordance with the present invention.

Specifically, the present invention also provides a composite substrate material, comprising at least two substrate materials bonded to each other with functional films, which have photo-catalytic effects, intervening between the at least two substrate materials. In the composite substrate material in accordance with the present invention, each of the functional films should preferably be a film containing $TiO_2$.

Also, in the composite substrate material in accordance with the present invention, each of the functional films should preferably also act as an anti-reflection film. Further, each of the functional films may be formed thin such that each of the functional films is optically negligible.

With the process for producing a composite substrate material in accordance with the present invention, when each of the functional films having the photo-catalytic effects, such as metal oxide films, typically $TiO_2$, is exposed to the light having a wavelength falling within the absorption wavelength range of the functional film, the photo-catalytic effects of the functional film occur. As a result, organic substances, and the like, which cling to the surface of each of the substrate materials, are decomposed approximately perfectly, and a super-hydrophilic state occurs on the surface of each of the substrate materials. Thereafter, the substrate materials are combined with each other such that the surfaces of the substrate materials, which surfaces are provided with the functional films, stand facing each other. Also, a load and heat are applied to the combined substrate materials. In this manner, the substrate materials are bonded to each other with a high bond strength. The bonded area has high long-term reliability and good environmental temperature resistance characteristics.

Further, with the process for producing a composite substrate material in accordance with the present invention, wherein wet processing need not be performed, the effects described above can be obtained easily.

Particularly, with the process for producing a composite substrate material in accordance with the present invention, wherein each of the functional films also acts as the anti-reflection film, a composite substrate material, which is substantially free from reflection loss at the bonded area or exhibits little reflection loss at the bonded area, can be obtained. Also, with the process for producing a composite substrate material in accordance with the present invention, wherein each of the functional films is formed thin such that each of the functional films is optically negligible, a composite substrate material, which is substantially free from scattering loss at the bonded area or exhibits little scattering loss at the bonded area, can be obtained.

In this manner, for example, a reflectivity at the bonded area of a plurality of optical substrates (or crystals) can be limited easily and reliably to a value of approximately at most 0.2%. Also, it becomes possible to directly bond laser crystals, optical wavelength converting crystals, or other crystals in solid lasers, and the like, to each other. Therefore, with the process for producing a composite substrate material in accordance with the present invention, a subminiature solid laser having reliable performance can be furnished.

DESCRIPTION OF THE PREFERRED EMBODIMENTS

The present invention will hereinbelow be described in further detail with reference to the accompanying drawings.

FIGS. 1A, 1B, 1C, and 1D show steps in a first embodiment of the process for producing a composite substrate material in accordance with the present invention.

Figure 1A:
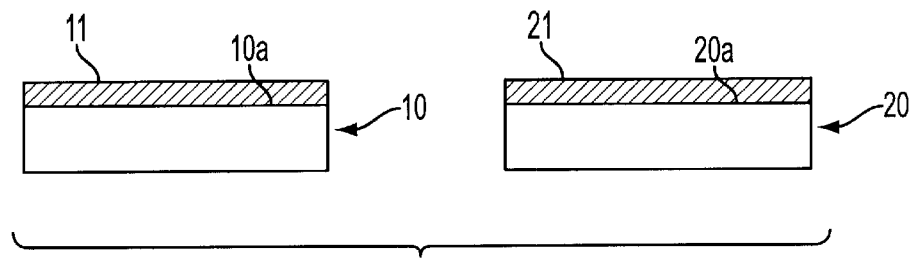
FIGS. 1A, 1B, 1C, and 1D are schematic views showing steps in a first embodiment of the process for producing a composite substrate material in accordance with the present invention.

Firstly, as illustrated in FIG. 1A, two Si wafers 10 and 20, which act as substrate materials, are prepared. The Si wafers 10 and 20 respectively have surfaces 10a and 20a, which have been subjected to mirror finish. Thereafter, $TiO_2$ thin films 11 and 21, which act as functional films having photo-catalytic effects, are respectively formed on the surfaces 10a and 20a. In this embodiment, each of the Si wafers 10 and 20 has a thickness of 300 $\mu$m. Also, the $TiO_2$ thin films 11 and 21 can be formed with, for example, a sputtering technique or a sol-gel technique.

Figure 1B:
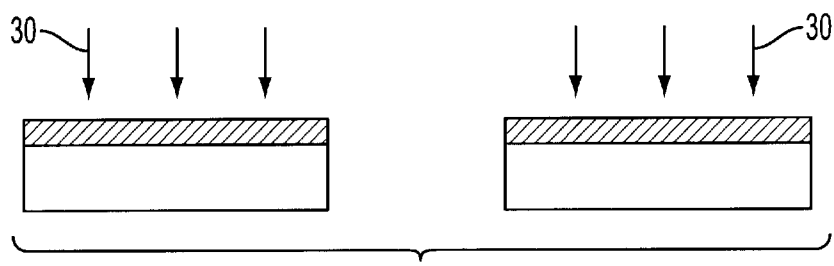

Thereafter, as illustrated in FIG. 1B, the surface of each of the $TiO_2$ thin films 11 and 21 is exposed to ultraviolet light 30 having a wavelength of at most 380 nm. As a result, the photo-catalytic effects of the $TiO_2$ thin films 11 and 21 occur. With the photo-catalytic effects, organic substances, and the like, which cling to the surfaces 10a and 20a of the Si wafers 10 and 20 respectively, are decomposed approximately perfectly, and a superhydrophilic state occurs on each of the surfaces 10a and 20a.

Figure 1C:
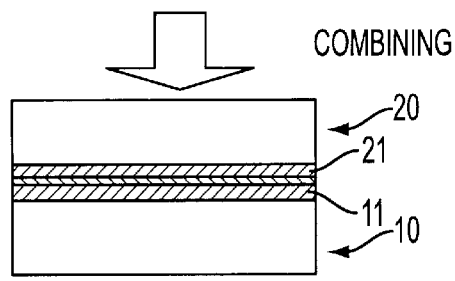
Figure 1D:
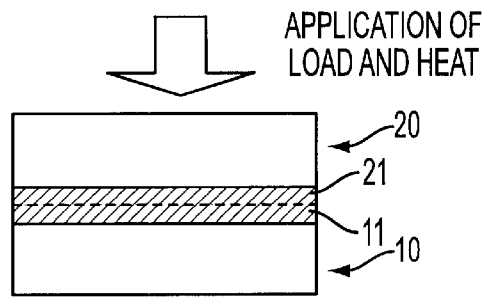

Thereafter, as illustrated in FIG. 1C, the Si wafers 10 and 20 are immediately combined with each other such that the surfaces 10a and 20a stand facing each other. As illustrated in FIG. 1D, a load and heat are applied to the Si wafers 10 and 20, which have thus been combined with each other. In this step, the load is set at, for example, approximately 500 g/cm$^2$. Also, the heating is performed, for example, at a temperature of 300° C. for one hour.

Thereafter, the Si wafers 10 and 20 are cooled and the load is removed from them. In this manner, wafer bonding is finished. When the bond strength of the Si wafers 10 and 20 was measured with a push-pull gauge, it was confirmed that a bond strength of at least 2 kg/cm$^2$ could be obtained.

A second embodiment of the process for producing a composite substrate material in accordance with the present invention will be described hereinbelow. In the second embodiment, a quartz glass plate and a LiNbO$_3$ wafer are employed as the substrate materials. The quartz glass plate has a refractive index of 1.45 with respect to light having a wavelength of 550 nm, has a thickness of 300 $\mu$m, and has been subjected to mirror finish. The LiNbO$_3$ wafer has a refractive index of 2.25 with respect to light having a wavelength of 550 nm, has a thickness of 500 $\mu$m, and has been subjected to mirror finish. Also, $TiO_2$ acting as a high refractive index material, $SiO_2$ acting as a low refractive index material, MgF, and the like, are overlaid on each of one surface of the quartz glass plate and one surface of the LiNbO$_3$ wafer. In this manner, a multi-layer film, which acts as an anti-reflection film with respect to the refractive indexes of the quartz glass plate and the LiNbO$_3$ wafer when the quartz glass plate and the LiNbO$_3$ wafer are combined with each other, is formed.

At this time, the film formation is designed such that the $TiO_2$ thin film constitutes the top layer on the surface of each of the quartz glass plate and the LiNbO$_3$ wafer. Thereafter, the surface of each of the $TiO_2$ thin films overlaid on the quartz glass plate and the LiNbO$_3$ wafer is exposed to ultraviolet light having a wavelength of at most 380 nm. As a result, the photo-catalytic effects of the $TiO_2$ thin films occur. With the photo-catalytic effects, organic substances, and the like, which cling to the surfaces of the quartz glass plate and the LiNbO$_3$ wafer, are decomposed approximately perfectly, and a super-hydrophilic state occurs on each of the surfaces of the quartz glass plate and the LiNbO$_3$ wafer.

Thereafter, the quartz glass plate and the LiNbO$_3$ wafer are immediately combined with each other such that the surfaces, which have been set in the super-hydrophilic state, stand facing each other. Also, a load and heat are applied to the quartz glass plate and the LiNbO$_3$wafer, which have thus been combined with each other. In this step, the load is set at, for example, approximately 500 g/cm$^2$. Also, the heating is performed, for example, at a temperature of 300° C. for one hour.

Thereafter, the quartz glass plate and the LiNbO$_3$ wafer are cooled and the load is removed from them. In this manner, wafer bonding is finished. When the bond strength of the quartz glass plate and the LiNbO$_3$ wafer was measured with a push-pull gauge, it was confirmed that a bond strength of at least 2 kg/cm$^2$ could be obtained.

Also, when optical reflection loss at the bonded area between the quartz glass plate and the LiNbO$_3$ wafer was measured, it was confirmed that the optical reflection loss was restricted to a value of at most 0.2%, and that the multi-layer coating film containing the $TiO_2$ thin film acted as the anti-reflection film.

A third embodiment of the process for producing a composite substrate material in accordance with the present invention will be described hereinbelow. In the third embodiment, two quartz substrates are employed as the substrate materials. Each of the two quartz substrates has a refractive index of 1.45 with respect to light having a wavelength of 550 nm, has a thickness of 300 $\mu$m, and has been subjected to mirror finish. Also, a $TiO_2$ thin film is formed to a thickness of at most 50 nm on each of the surfaces of the quartz substrates. Thereafter, the surface of each of the $TiO_2$ thin films overlaid on the quartz substrates is exposed to ultraviolet light having a wavelength of at most 380 nm. As a result, the photo-catalytic effects of the $TiO_2$ thin films occur. With the photo-catalytic effects, organic substances, and the like, which cling to the surfaces of the quartz substrates, are decomposed approximately perfectly, and a super-hydrophilic state occurs on each of the surfaces of the quartz substrates.

Thereafter, the quartz substrates are immediately combined with each other such that the surfaces, which have been set in the super-hydrophilic state, stand facing each other. Also, a load and heat are applied to the quartz substrates, which have thus been combined with each other.

In this step, the load is set at, for example, approximately 500 g/cm². Also, the heating is performed, for example, at a temperature of 300° C. for one hour.

Thereafter, the quartz substrates are cooled and the load is removed from them. In this manner, wafer bonding is finished. When the bond strength of the quartz substrates was measured with a push-pull gauge, it was confirmed that a bond strength of at least 2 kg/cm² could be obtained.

Also, it was confirmed that no scattering loss occurred at the bonded area between the quartz substrates. Ordinarily, in cases where the film thickness of the functional film, such as the $TiO_2$ thin film, is set at a value of at most 50 nm, the presence of the functional film becomes optically negligible.

In the embodiments described above, two substrate materials are bonded to each other. However, the process for producing a composite substrate material in accordance with the present invention is also applicable when three or more substrate materials are bonded to one another.

In addition, all of the contents of Japanese Patent Application No. 11(1999)-254350 are incorporated into this specification by reference.

What is claimed is:

1. A process for producing a composite substrate material, comprising the steps of:

i) overlaying, on a surface of each of at least two substrate materials, a bonding film which is capable of generating photo-catalytic effects and causing a super-hydrophilic state to occur on said surface, ii) exposing the bonding film, which has been overlaid on the surface of each of the at least two substrate materials, to light having a wavelength falling within an absorption wavelength range of the bonding film to generate said photo-catalytic effects and to cause said super-hydrophilic state to occur on the surface, and iii) bonding the at least two substrate materials to each other with the functional films, which have been exposed to the light, wherein the bonding films are positioned between the at least two substrate materials.

2. A process as defined in claim 1 wherein the functional film is a film containing $TiO_2$.

3. A process as defined in claim 2 wherein the light irradiated to the functional film is ultraviolet light.

4. A process as defined in claim 1, 2, or 3 wherein a film in addition to the bonding film is overlaid on the surface of each of the at least two substrate materials, and the functional film is formed as a top layer.

* * * * *